United States Patent [19]
Graber

[11] 3,994,400
[45] Nov. 30, 1976

[54] BICYCLE DISPLAY RACK
[75] Inventor: Thomas L. Graber, Madison, Wis.
[73] Assignee: Joseph V. Graber, Middleton, Wis.
[22] Filed: Apr. 18, 1975
[21] Appl. No.: 569,202

[52] U.S. Cl. ................................ 211/22; 211/200; 248/164
[51] Int. Cl.² ........................................ A47F 7/04
[58] Field of Search .................. 211/40, 17, 20–24, 211/195, 200; 248/164; 108/108; 5/116

[56] References Cited
UNITED STATES PATENTS

| | | | |
|---|---|---|---|
| 329,150 | 10/1885 | Eaton | 211/40 X |
| 1,008,124 | 11/1911 | Dudley | 211/40 |
| 2,323,846 | 7/1943 | Saltsman | 211/24 |
| 2,892,548 | 6/1959 | Huff | 211/40 X |
| 3,455,461 | 7/1969 | Kesling | 211/21 |

FOREIGN PATENTS OR APPLICATIONS

| | | | |
|---|---|---|---|
| 224,109 | 10/1942 | Switzerland | 211/22 |
| 742,025 | 12/1955 | United Kingdom | 211/22 |
| 451,367 | 8/1936 | United Kingdom | 211/21 |

Primary Examiner—Roy D. Frazier
Assistant Examiner—Terrell P. Lewis
Attorney, Agent, or Firm—Morsbach & Pillote

[57] ABSTRACT

A bicycle display rack including a pair of generally horizontal frame members mounted on legs in spaced parallel relation above the ground to support a bicycle in an upwardly inclined position with one wheel resting crosswise of the frame members and having wheel engaging units at spaced locations along the frame members for engaging relatively opposite sides of a bicycle wheel resting on the frame members to laterally stabilize the bicycle. The rack is arranged so that bicycles can be mounted on the rack from or both sides of the rack.

5 Claims, 5 Drawing Figures

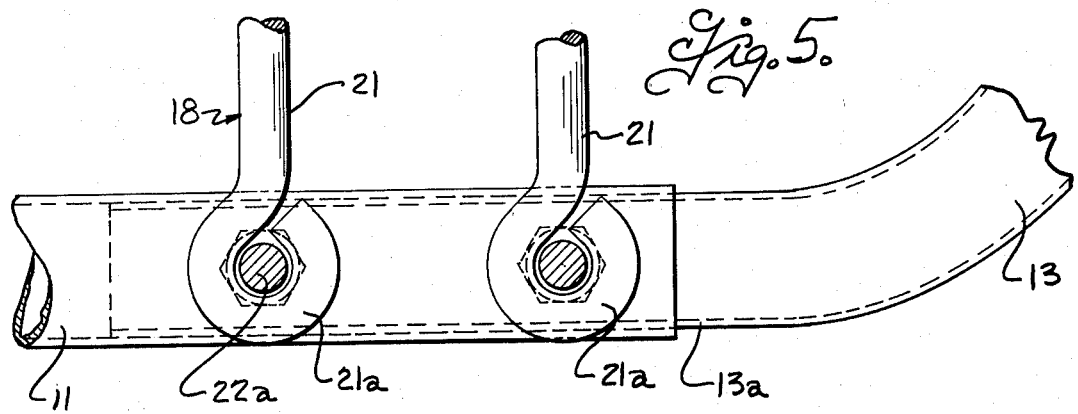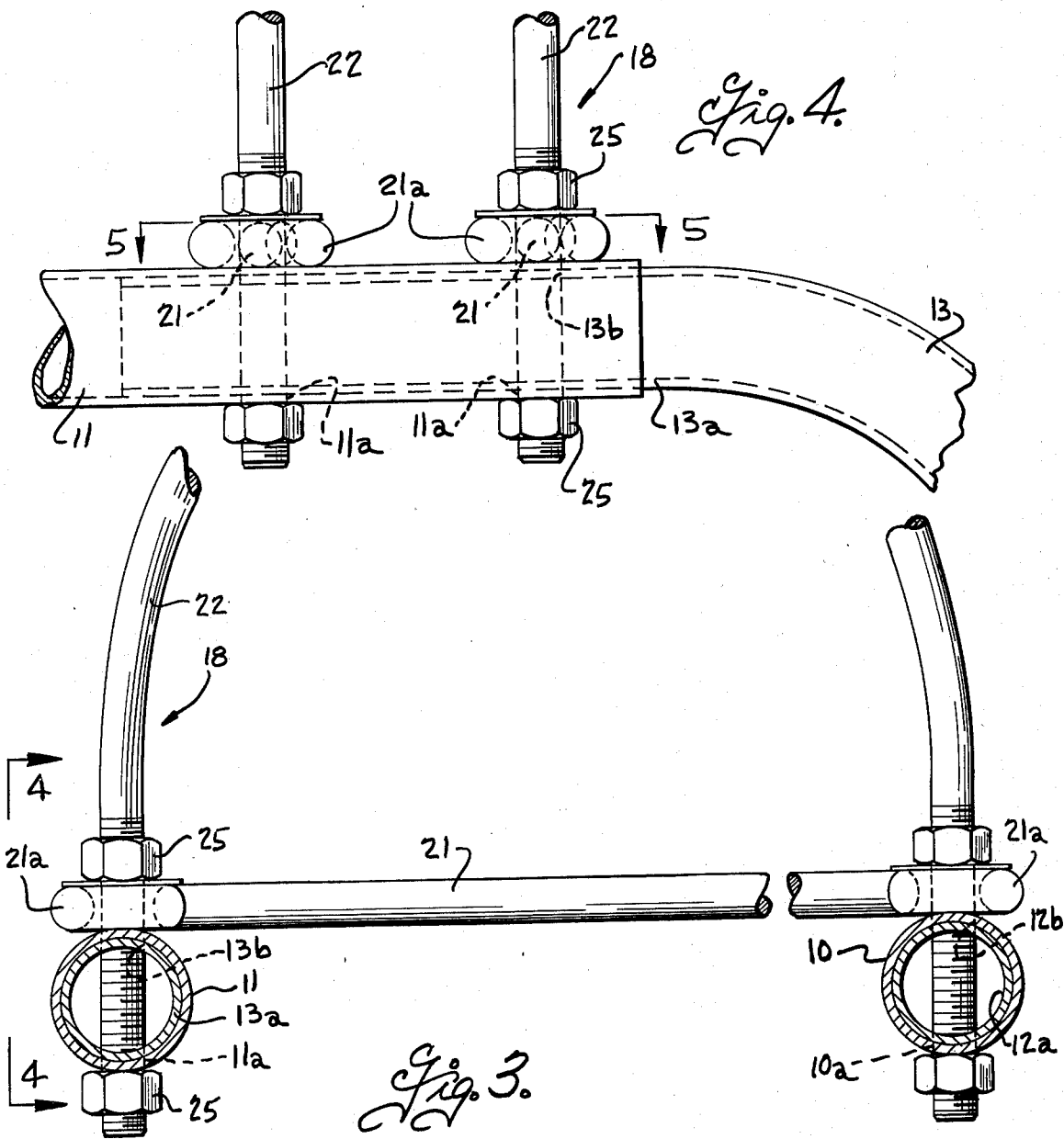

BICYCLE DISPLAY RACK

BACKGROUND OF THE INVENTION

In bicycle shops and the like, bicycles are frequently displayed on the floor supported by their own bicycle stands or by a rack which laterally stabilizes the bicycle when resting on the floor. In order to conserve the space required for displaying bicycles, two-level bicycle racks are sometimes provided which store a first row of bicycles at floor level and a second row of bicycles at an elevated level above the first row. Such two-level racks, however, must be made of quite heavy construction to provide a sturdy support for the elevated row of bicycles and are accordingly somewhat expensive to build and erect. Moreover, in the two-level bicycle racks, it is necessary to lift the entire weight of the bicycle when installing and removing the same from the upper level.

SUMMARY OF THE INVENTION

The present invention relates to a bicycle display rack for displaying a plurality of bicycles.

An important object of this invention is to provide a bicycle display rack which will support a plurality of bicycles in less space than required for the usual floor-level display.

Another object of this invention is to provide a bicycle display rack in accordance with the foregoing object, which is light in weight and which can be easily moved from one location to the other.

A more particular object of this invention is to provide a bicycle display rack which will support two rows of bicycles disposed at opposite sides of the rack with one wheel of each bicycle at a substantial elevation above the ground so that the bicycles are displayed in an upwardly and inclined position.

These, together with other objects and advantages of this invention will be more readily understood by reference to the following detailed description when taken in connection with the accompanying drawings wherein:

FIG. 3 is a transverse sectional view taken on the plane 3—3 of FIG. 2 and showing the parts on a larger scale;

FIG. 4 is a fragmentary side elevational view taken on the plane 4—4 of FIG. 3;

FIG. 5 is a fragmentary horizontal sectional view taken on the plane 5—5 of FIG. 4.

Figure 1:
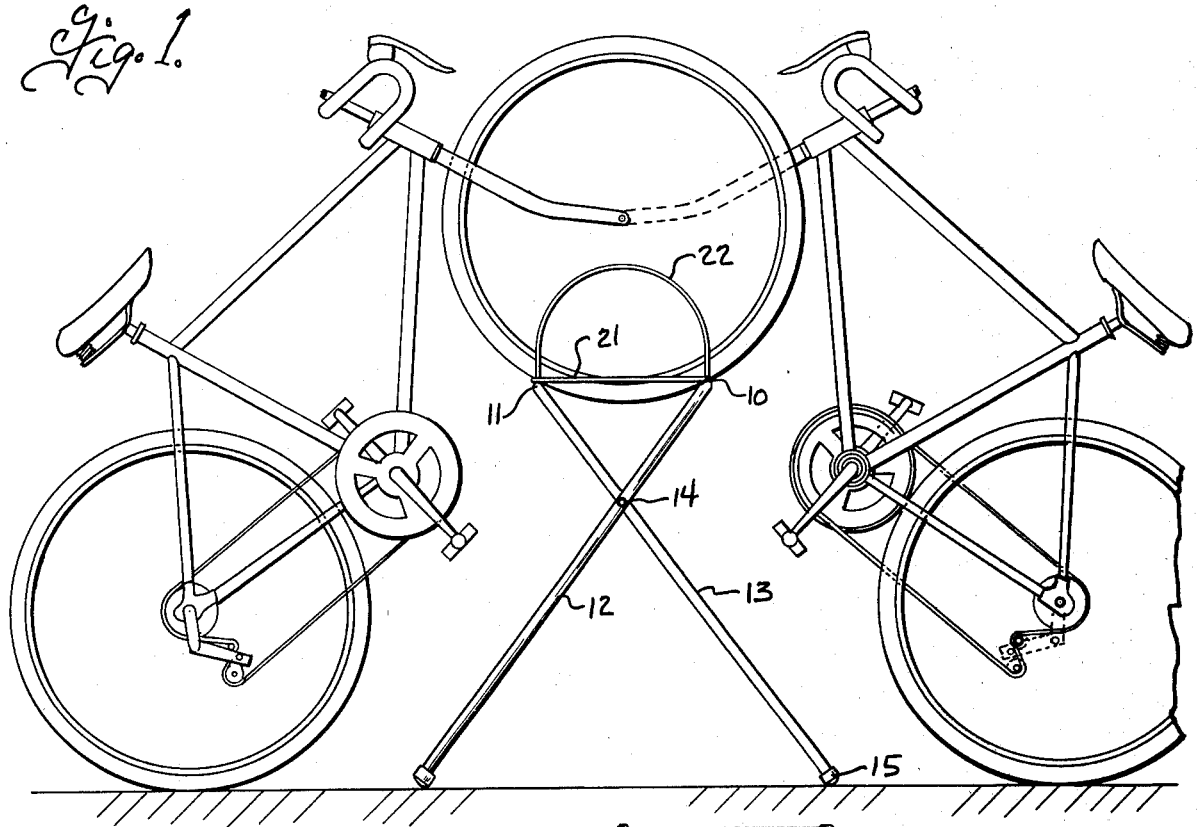
FIG. 1 is a side elevational view of a bicycle display rack embodying the present invention and showing bicycles mounted thereon.

The bicycle display rack includes a pair of elongated frame members 10 and 11 mounted on legs 12 and 13 to extend generally horizontally and in spaced relatively parallel relation at a level above the ground a distance somewhat greater than the outer diameter of the bicycle wheel and preferably of the order of 28–30 inches for full size bicycles to support the bicycle in an upwardly inclined position as shown in FIG. 1. The frame members 10 and 11 are spaced apart a distance, for example about 12 inches, which is substantially less than the diameter of a bicycle wheel to support the front wheel when positioned crosswise of the frame members. The frame members are conveniently formed of tubular stock to provide a light weight but rigid support for the bicycles and may, for example, be formed of 1 inch tubing. The legs 12 and 13 are arranged to cross intermediate their ends and are interconnected by a bolt 14. The frame members are attached to the upper ends of the crossing legs and, advantageously, the ends of the legs are bent laterally to provide end portions 12a and 13a respectively that are telescopically received in the ends of the frame members 10 and 11 respectively. The leg members can be formed of ⅞ inch tubular stock so as to be receivable in the ends of the 1 inch tubular frame members and advantageously have a length to support the frame members at a level of about 2½ feet above the ground. Protective end caps 15 are provided at the lower ends of the legs.

Figure 2:
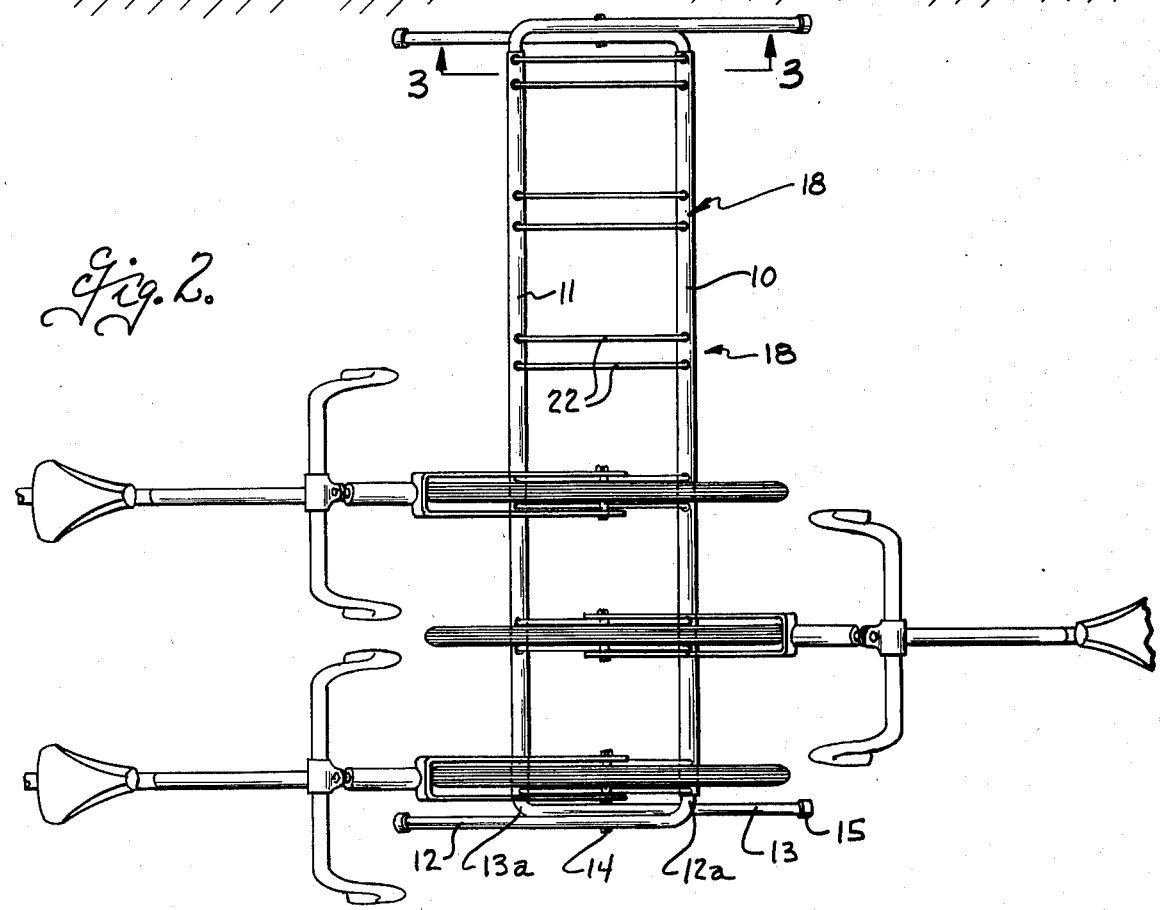
FIG. 2 is a top plan view of a bicycle display rack of FIG. 1.

A plurality of wheel engaging units 18 are mounted on the frame members at spaced locations therealong for engaging opposite sides of the bicycle wheel therebetween to laterally stabilize the bicycle. The wheel engaging units 18 each include a pair of lower bars 21 extending crosswise between the frame members 10 and 11 and which are spaced apart a distance corresponding to the transverse width of the bicycle tire to receive the bicycle wheel therebetween as shown in FIGS. 1 and 2. The wheel engaging units also include a pair of upper bars 22 which are also spaced apart to receive a bicycle wheel therebetween and which extend upwardly above the lower bars a distance less than the radius of the bicycle wheel to engage the bicycle wheel at a level above the lower bars and below the wheel axis, as shown in FIG. 1. The upper bars 22 are conveniently in the form of arcuate members having threaded end portions 22a and the lower bars 21 are preferably in the form of straight bars having loops 21a at opposite ends. The frame members 10 and 11 are formed with spaced pairs of openings 10a and 11a respectively and the threaded ends 22a of the arcuate upper bars extend through the loops 21a on the arcuate bars 21 and through the openings 10a, 11a and the frame members to rigidly mount the upper and lower bars of each pair on the frame members. As shown, clamp nuts 25 are provided on the threaded end portions of the upper bars to clamp the parts in assembled relation. The laterally extending ends 12a and 13a of the legs preferably extend into the frame members past one or more of the openings 10a, 11a therein and the ends of the legs have openings 12b, 13b adapted to receive the threaded ends of the upper bars of the end wheel engaging units to be retained in assembled relation thereby.

The display rack is arranged so that bicycles can be mounted on the rack from either one or both sides thereof and the adjacent wheel engaging units 18 are spaced apart a distance, for example about 10 inches, which is greater than one-half the transverse width of the bicycle handle bars but less than the full transverse width of the handle bars so that bicycles can be mounted in adjacent wheel engaging units from relatively opposite sides of the rack without interference between the handle bars on sidewise adjacent bicycles, as shown in FIG. 2. Alternatively, bicycles can be mounted at only one side of the rack with adjacent bicycles facing in relatively opposite directions to avoid interference between the handle bars on bicycles in adjacent wheel engaging units. With this arrangement, some bicycles would be mounted with their front wheels in alternate ones of the wheel engaging units 18 and other bicycles would be mounted with their rear wheels in the other wheel engaging units. Further, since the rack supports the bicycles with one wheel spaced above the ground a distance greater than the diameter of a full size bicycle wheel and with the handle bars also elevated as shown in FIG. 1, additional bicycles can be stored at ground level with one wheel below the rack. For example, when alternate bicycles are mounted at relatively opposite sides of the rack as shown in FIG. 2, additional bicycles can be stored at ground level at each side of the rack between sidewise adjacent bicycles and with the front or rear wheel disposed below the frame members 10, 11. When bicycles are mounted in the rack at only one side, then an additional row of bicycles can be mounted at floor level at the other side of the rack and with one wheel underlying the frame members 10, 11.

From the foregoing it is thought that the construction and use of the bicycle display rack will be readily understood. The legs, frame members, and the upper and lower bars of the wheel engaging units can be disassembeled to enable compact packaging of the rack. When assembled, the rack provides a stable support for the bicycles and supports the bicycles in an upwardly inclined position so that the overall space required for displaying the bicycles is less than the space required for floor display of the bicycles. Moreover, the bicycles can be mounted at one or both sides of the rack and the spacing of the adjacent wheel engaging units is such that there is no interference between the handle bars on sidewise adjacent bicycles. Further, additional bicycles can be stored at ground level intermediate the bicycles stored in the rack. The wheel engaging units engage the elevated wheel of the bicycle adjacent its outer periphery as well as at a location intermediate the periphery and the wheel axis to provide a laterally stable support for the bicycle and, since the bicycles are supported with one wheel resting on the ground, it is not necessary to lift the entire weight of the bicycle in order to mount and demount the bicycle from the rack.

The embodiments of the invention in which an exclusive property or privilege is claimed are defined as follows:

1. A rack for displaying a plurality of bicycles comprising, a pair relatively parallel tubular frame members spaced apart a distance substantially less than the diameter of a bicycle wheel, a pair of relatively crossing tubular legs at each end of said frame members, means pivotally interconnecting the legs of each pair intermediate their ends, said legs each having integral upper end portions curved to extend laterally of the respective leg and telescopically engage the end of a respective one of the tubular frame members to interconnect the legs and frame members, a plurality of pairs of lower bars attached to the frame members and extending therebetween at spaced locations therealong with the lower bars of each pair spaced apart a distance to receive a bicycle wheel therebetween, a plurality of pairs of upper bars attached to the frame members and extending therebetween with each pair of upper bars arched above a respective pair of lower bars a distance less than the radius of a bicycle wheel for engaging a bicycle wheel therebetween at a level above the lower bars to laterally stabilize the bicycle.

2. A rack for displaying a plurality of bicycles according to claim 1 wherein said frame members have transverse openings at spaced locations therealong, said lower bars including rods having loops at opposite ends and said upper bars comprising arcuate bars having threaded ends extending through the end loops on respective lower bars and through respective openings in the frame members.

3. A rack for displaying a plurality of bicycles according to claim 1 wherein spacing between the centers of adjacent pairs of lower bars on the frame members is greater than one-half but less than the full transverse width of the bicycle handle bars whereby bicycle can be mounted between adjacent pairs of lower bars from relatively opposite sides of the rack without interference between the handle bars on sidewise adjacent bicycles.

4. A rack for displaying a plurality of bicycles according to claim 3 wherein said legs support said frame members at a distance above the ground greater than the outer diameter of a bicycle wheel and provide an unobstructed space below the frame members.

5. A rack for displaying a plurality of bicycles according to claim 1 wherein said tubular frame members have transverse openings at spaced locations therealong, said upper end portions of said legs each having at least one opening registering with one of the openings in the tubular frame members, said upper bars comprising arcuate bars having threaded ends extending through respective openings in the frame members, the threaded ends on the upper bars adjacent the ends of the frame members also extending through the openings in the upper end portions of the legs to secure the legs to the frame members.

* * * * *